United States Patent [19]

Jones et al.

[11] 4,225,744
[45] Sep. 30, 1980

[54] FIXED THERMOCOUPLE FOR VACUUM ELECTRIC FURNACES

[75] Inventors: William R. Jones, Chalfont; Prem C. Jindal, Feasterville, both of Pa.

[73] Assignee: Abar Corporation, Feasterville, Pa.

[21] Appl. No.: 3,659

[22] Filed: Jan. 15, 1979

[51] Int. Cl.³ .............................................. H05B 7/16
[52] U.S. Cl. ...................................................... 13/20
[58] Field of Search .................. 13/20, 24, 1; 174/211

[56] References Cited

U.S. PATENT DOCUMENTS

| | | |
|---|---|---|
| 1,837,256 | 12/1931 | Egan . |
| 2,282,226 | 5/1942 | Hoop ........................................ 13/24 |
| 2,837,654 | 6/1958 | Berghaus et al. |
| 3,437,784 | 4/1969 | Jones et al. |
| 3,650,930 | 3/1972 | Jones et al. |
| 3,761,370 | 9/1973 | Keller . |
| 4,077,783 | 3/1978 | Honacker ........................ 174/211 X |
| 4,102,637 | 7/1978 | Kreider et al. ....................... 13/32 X |
| 4,109,157 | 8/1978 | Tanaka et al. |
| 4,124,199 | 11/1978 | Jones et al. ............................. 266/88 |

OTHER PUBLICATIONS

Case Hardening, Metals Handbook, 1948, American Society for Metals, pp. 677–702.

Primary Examiner—Roy N. Envall, Jr.
Attorney, Agent, or Firm—Zachary T. Wobensmith, 2nd; Zachary T. Wobensmith, III

[57] ABSTRACT

A fixedly mounted thermocouple for vacuum electric furnaces is described, which is particularly suitable for furnaces for nitrided or carburized case formation and which is particularly suited to avoid line of sight metallic deposition on the mounting from sputtering in the furnace and which could result in shorting, spaced shields being provided on the thermocouple mounting for this purpose.

4 Claims, 4 Drawing Figures

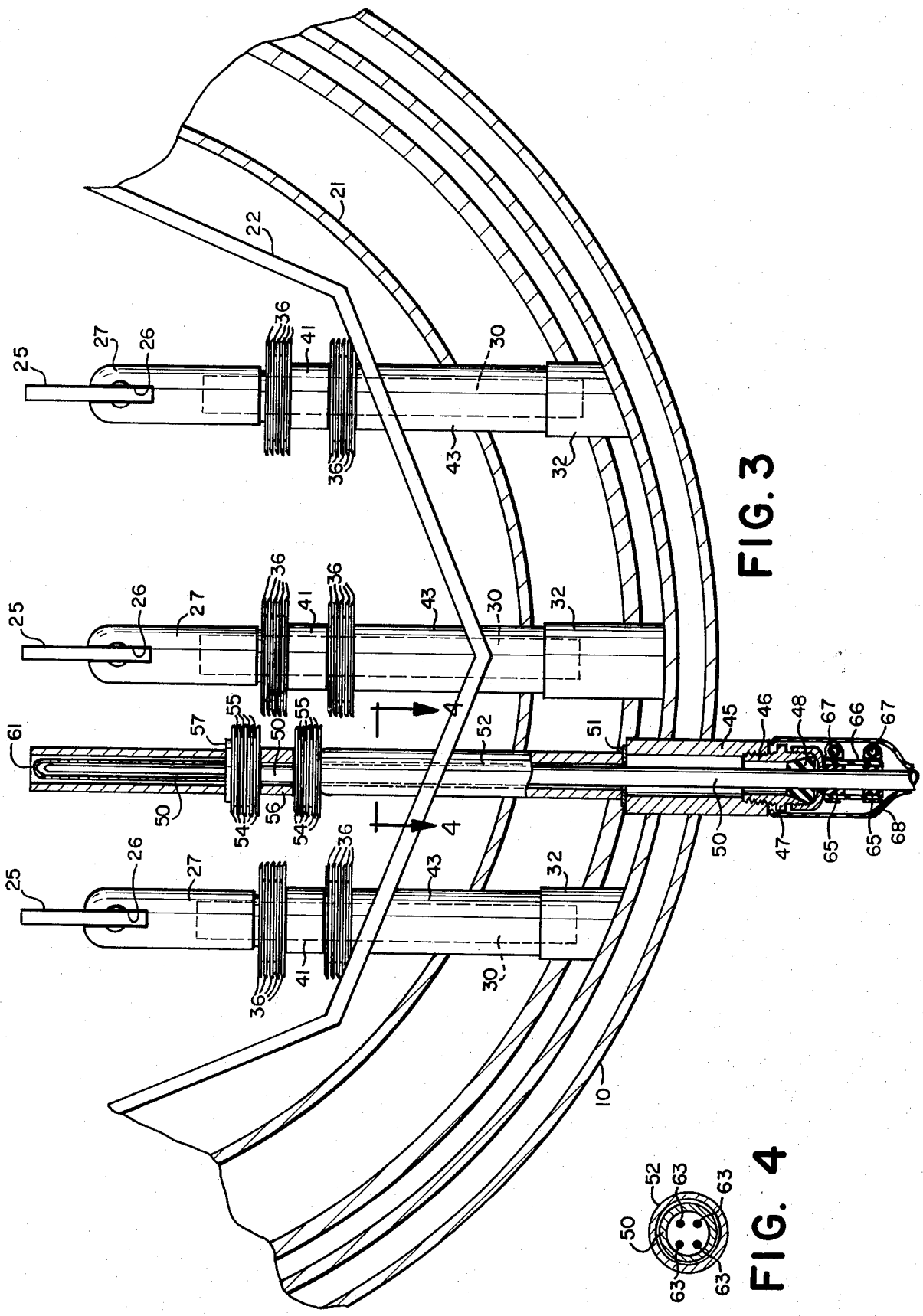

FIXED THERMOCOUPLE FOR VACUUM ELECTRIC FURNACES

BACKGROUND OF THE INVENTION

1. Field of the Invention

This invention relates to fixed or rigid thermocouple mountings having provisions to avoid metallic deposition on the mounting during case formation on ferrous articles.

2. Description of the Prior Art

It has heretofore been proposed, as described in American Society for Metals, Metals Handbook, Vol. 2, commencing at p. 677, to carburize the surface of a ferrous work piece or ion nitride the surface of a work piece to provide a case which may be hardened as the case is formed or which may subsequently be hardened.

Examples of ion nitriding by ionization in a chamber of a nitrogen containing gas are shown in the U.S. Patents to Egan, U.S. Pat. No. 1,837,256, Berghaus et al., U.S. Pat. No. 2,837,654, Keller, U.S. Pat. No. 3,761,370, Jones et al., U.S. Pat. Nos. 3,437,784 and 3,650,930, and Tanaka et al., U.S. Pat. No. 4,109,157.

Materials that are sputtered from the work travel in straight lines, tend to build up on work supports and other exposed elements in the furnace and may cause electrical shorting. The tendency to shorting is greatly reduced in this structure by the use of shields which comprise insulating discs and spacers supported on the mounting.

SUMMARY OF THE INVENTION

In accordance with the invention a fixedly mounted thermocouple is provided particularly for use in an ion carburizing or ion nitriding vacuum furnace and in which the mounting has spaced shields to reduce line of sight deposition from sputtering in the furnace on the thermocouple mounting.

It is the principal object of the invention to provide protective shielding for the thermocouple mounting of a fixed thermocouple in a vaccum furnace to prevent metallic deposition on the mounting resulting from sputtering in the furnace.

It is a further object of the invention to provide simple but effective shields of spaced insulated discs.

It is a further object of the invention to provide shields of the character aforesaid which can be readily removed and replaced if desired.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which:

FIG. 3 is a fragmentary transverse sectional view, enlarged, taken aproximately on the line 3—3 of FIG. 1; and FIG. 4 is a transverse sectional view taken approximately on the line 4—4 of FIG. 3.

Figure 2:
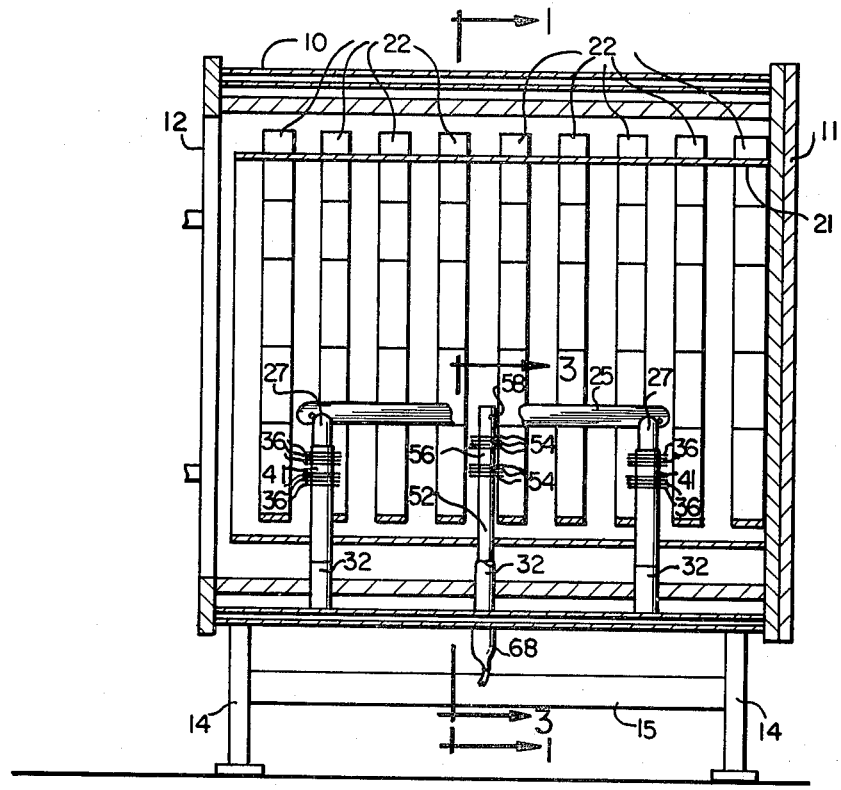
FIG. 2 is a longitudinal sectional view taken approximately on the line 2—2 of FIG. 1.
Figure 1:
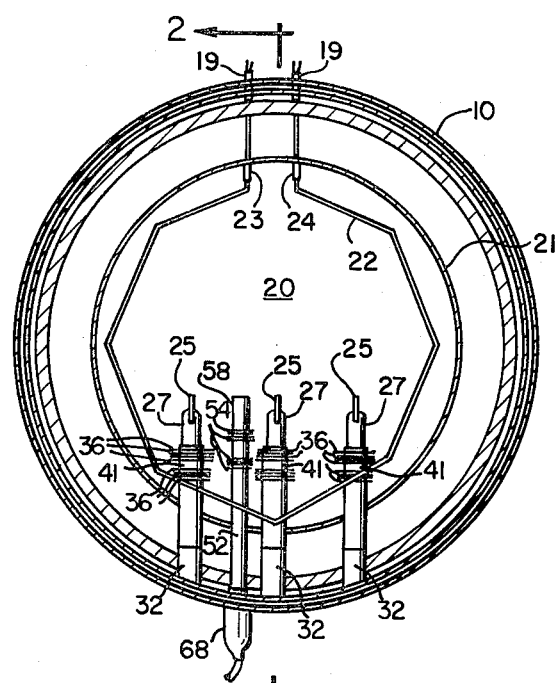
FIG. 1 is a transverse sectional view of a vacuum furnace chamber taken approximately on the line 1—1 of FIG. 2.

It should of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, in which a preferred embodiment of apparatus is illustrated, a vacuum furnace of any desired type is provided, the furnace illustrated being horizontal and preferably having an outer cylindrical wall or shell 10 closed at one end in any desired manner, such as by a door or an end closure plate 11. A door (not shown) is provided, hingedly mounted on the wall 10 at the other end and movable to a closed position with respect to the end flange 12 of the shell 10. Suitable vacuum tight packing (not shown) is interposed between the door (not shown) and the end flange 12 on the wall 10.

The shell 10 can be supported in any desired manner, such as by supports 14 with suitable intermediate bracing 15.

Suitable provisions (not shown) can be made for evacuating the furnace chamber and for providing a suitable gas or gas mixture to supply ions. One suitable apparatus for this purpose is shown in U.S. Pat. No. 4,124,199, dated Nov. 7, 1978 William R. Jones and Prem C. Jindal.

A vacuum chamber 20 is thus provided within the shell 10, the closure wall 11 and the door (not shown).

Within the shell 10, a cylindrical ring heat shield 21 is provided for reflecting heat inwardly within the shell 10 and reducing heat leakage outwardly.

Within the shield 21, a plurality of spaced alloy metal strip type heating elements 22 are also preferably provided disposed from end to end within the chamber 20. The heating elements 22 are supported in any desired manner and are provided with conductors 23 and 24 extending through sealing bushings 19 in the shell 10 for activation when desired.

Within the chamber 20, horizontal work supports of heat resistant metal of any suitable type are provided which include rails 25 extending lengthwise in the chamber 20. The rails 25 are carried in slots 26 in rail holders 27 and are centered by pins 28. The rail holders 27 are supported by vertical support rods 30, preferably ceramic rods with suitable electrical insulating properties. This structure is shown in detail in the application of Rush B. Gunther and Prem C. Jindal for Letters Patent for Work Support for Vacuum Electric Furnaces, fild Dec. 20, 1978, Ser. No. 971,483.

The support rods 30 are supported in sockets 32 of differing lengths to compensate for the curvature of the wall 10 and which are secured to the inner wall of the shell 10.

The support rods 30 on the exterior thereof, below the rail holders 27 are provided with a plurality of spaced discs 36 preferably formed of high temperature resistant non-electrical conductive material such as mica, asbestos, or other suitable material.

The discs 36 are preferably provided in two groups, five being shown in each group with a spacer tube 41 of ceramic between the groups.

The lower group of discs 36 is supported above the lower socket 32 by a ceramic tube 43.

The thermocouple mounting includes a socket 45 welded in place in the wall 10 of the furnace with a threaded plug 46 engaged in the socket 45. The plug 46 has a rim 47 to engage the outer end of the socket 45 with a tapered packing 48 of resilient material engaged in the plug 46.

A thermocouple tube 50 extends inwardly through the packing 48 and has a washer 51 secured thereto to abut on the inner end of the socket 45. The tube 50 has a spacer insulator 52, preferably of ceramic material thereon, at the inner end of which a plurality of spaced discs 54 are carried. The discs are preferably formed of high temperature resistant electrically non-conductive material such as mica, asbestos or other similar material with discs 55 of smaller diameter to provide spaces between the discs 54. An inner group of discs 54 and 55 are provided on the tube 50 with a spacer 56 therebetween. It is preferred that each group of discs 55 has a washer 57 therebeyond on which a tubular shield 58 of ceramic material is carried.

The tube 50 has a closed end 61. Within the tube a plurality of pairs of thermocouple wires 63 are provided, welded at their ends close to the closed end 61 of the tube 50. A plurality of pairs 63 are provided so that in the event of failure of one pair another pair may be utilized to determine the prevailing temperature.

The packing 48 is retained in position by inner sleeves 65 which are held in place by an outer sleeve 66 held in engagement therewith and with the pipe 50 by clamps 67. A protective cover 68 of rubber or the like covers the plug 46, packing 48, sleeve 66 and clamps 67.

In use metallic material from the sputtering in its line of sight movement will be prevented by inner groups of shields 55 from depositing on the spacer 54 contiguous to the shields 55 and by the outer group of shields 55 from depositing on contiguous and shielded portions of the spacer insulator 52.

It will be noted that the assembly and disassembly of the tubular shield 58, the washer 57, the discs 54 and 55, with their spacer 56 and spacer insulator 52 can be readily effected so that inspection, maintenance and replacement, as necessary, of various components can be quickly and easily carried out.

The tube 50, with its enclosed thermocouple wires 63, can also be readily detached upon removal of the clamps 67, the washers 65, the packing 48 and the plug 46.

We claim:

1. A fixed thermocouple assembly for vacuum electric furnaces having a hostile environment therein and containing electrically conductive ions capable of deposition on objects within the furnace comprising
    a thermocouple enclosing tube,
    sealing members exteriorly of said furnace for supporting said tube in said furnace,
    an electrical non-conductive tubular shield at the inner end of said tube,
    a spacer insulator member carried on said tube spaced from said tubular shield,
    a covering member for said thermocouple tube extending exteriorly of the furnace and in supporting relation to said spacer insulator member,
    at least one group of spaced shielding members of heat resistant electrical non-conducting material on said tube between said tubular shield and said spacer insulator member and extending outwardly from said tube for shielding said tube from deposition of electrically conductive material thereon,
    said shielding members comprising closely spaced readily replaceable discs of different diameters.

2. The combination defined in claim 1 in which
    a second group of shielding members are provided on said tube in spaced relation to said first group.

3. The combination defined in claim 1 in which
    said tube has a plurality of pairs of thermocouple wires disposed therein.

4. The combination defined in claim 1 in which
    said tubular shield, said spaced shielding members, said spacer insulator and said covering member are in sequence on said tube and said tubular shield, spaced shielding members and spacer insulator are readily removable from said tube interiorly of the furnace.

* * * * *